United States Patent [19]

Taylor, Jr. et al.

[11] Patent Number: 5,377,246
[45] Date of Patent: Dec. 27, 1994

[54] ELLIPTICAL METAL FUEL/CLADDING BARRIER AND RELATED METHOD FOR IMPROVING HEAT TRANSFER

[75] Inventors: Ira N. Taylor, Jr., Livermore; Donald C. Wadekamper, Pleasanton, both of Calif.

[73] Assignee: General Electric Company, San Jose, Calif.

[21] Appl. No.: 967,642

[22] Filed: Oct. 28, 1992

[51] Int. Cl.5 .................................. G21C 3/00
[52] U.S. Cl. ............................. 376/416; 376/417
[58] Field of Search ............... 376/451, 416, 417; 926/DIG. 53

[56] References Cited

U.S. PATENT DOCUMENTS

| | | | |
|---|---|---|---|
| H689 | 10/1989 | Christiansen et al. | 376/361 |
| 3,291,700 | 12/1966 | Brossa et al. | 376/471 |
| 3,620,691 | 11/1971 | Rubel | 29/191 |
| 3,803,776 | 4/1974 | Shaffer et al. | 51/326 |
| 4,022,662 | 5/1977 | Gordon et al. | 376/416 |
| 4,056,441 | 11/1977 | Marmonier et al. | |
| 4,971,753 | 11/1990 | Taylor, Jr. et al. | 376/417 |
| 4,978,480 | 12/1990 | Stansfield et al. | 264/0.5 |

OTHER PUBLICATIONS

Pitner, A. L. and Dittmer, J. O., "FFTF Metal Fuel Pin Bond Verification," Trans. Am. Nucl. Soc., vol. 59, pp. 144–145 (1989).

*Primary Examiner*—Donald P. Walsh
*Assistant Examiner*—Meena Chelliah
*Attorney, Agent, or Firm*—J. E. McGinness

[57] ABSTRACT

A barrier tube of non-circular cross section is arranged in the space between the stainless steel cladding and metal fuel slugs of a liquid metal reactor. The non-circular shape of this barrier design promotes improved thermal bonding in both the cladding/barrier and barrier/fuel interface regions. The non-circular barrier results in three areas with liquid metal thermal bond gaps having an angle which approaches that for a metal fuel pin without a barrier. Thus, the degree of circumferential unbonding will be less than that which results in localized fuel melting during radiation.

20 Claims, 1 Drawing Sheet

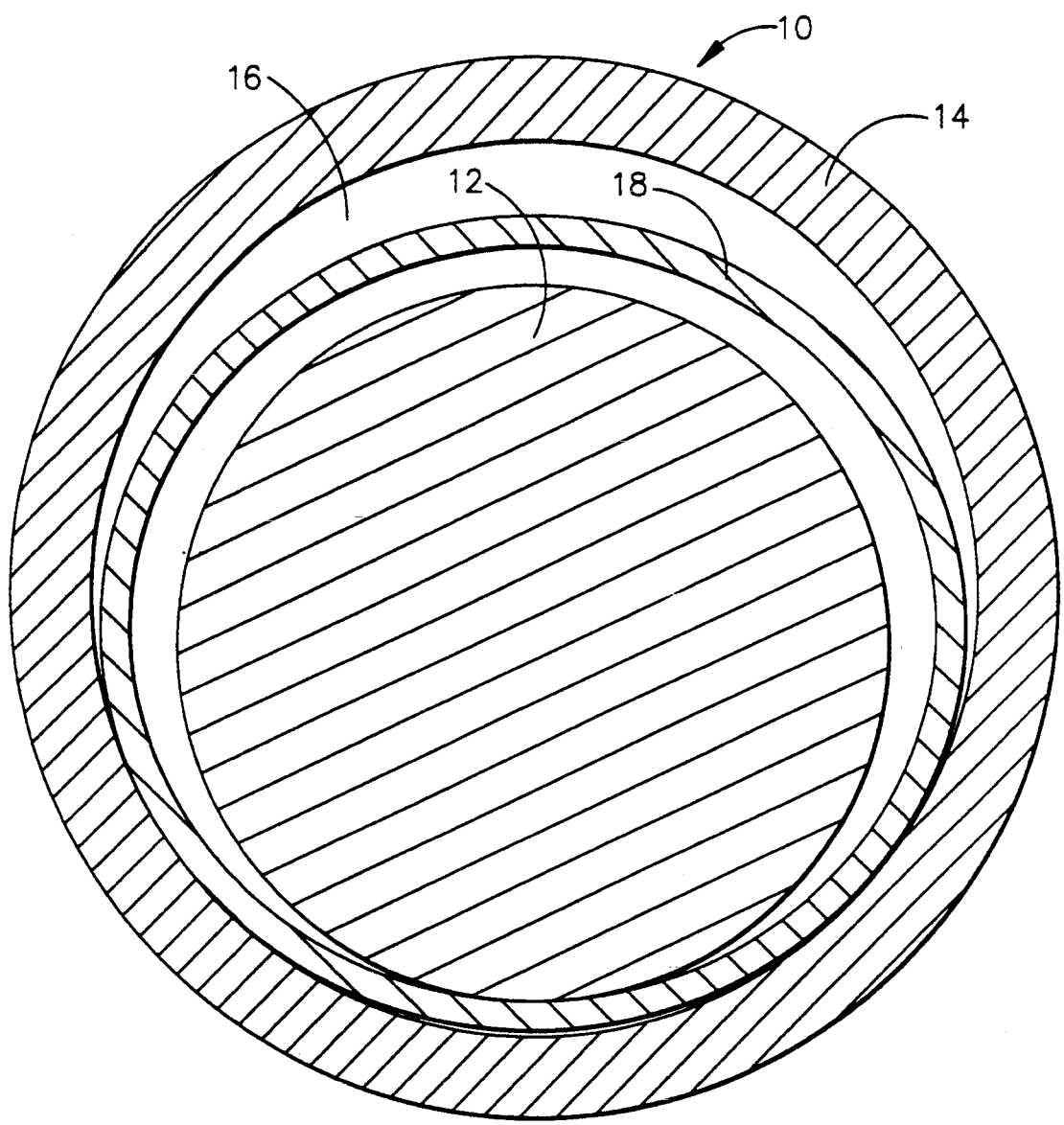

ELLIPTICAL METAL FUEL/CLADDING BARRIER AND RELATED METHOD FOR IMPROVING HEAT TRANSFER

FIELD OF THE INVENTION

This invention generally relates to fuel elements containing fissionable fuel material for use in nuclear reactors. In particular, the invention is directed to an improvement in nuclear reactor fuel elements containing fissionable fuel in metallic form and metal alloys which are housed within stainless steel containers.

BACKGROUND OF THE INVENTION

Typical fissionable nuclear fuels in metal form comprise uranium, plutonium and thorium, which can be employed alone or alloyed. The fuels currently utilized are primarily comprised of uranium metal. A preferred fuel comprises combinations of a major portion of uranium alloyed with a minor portion of plutonium, for example, 60–98 wt.% uranium metal with 2–40 wt.% plutonium metal.

Fissionable fuel materials in metallic form have a long history in the nuclear reactor field, but due to significant shortcomings, have conventionally been used primarily in the so-called breeder type of reactors utilizing liquid metal coolants. The primary drawbacks of the use of metallic fissionable material as fuel are their relatively low melting temperatures and accompanying loss of structural characteristics such as tensile strength at moderately low temperatures, and their high degree of reactivity with other elements, including susceptibility to corrosion. Uranium in metallic form (the most prevalent fissionable fuel material) melts at only 2070° F. (1132° C.), and an alloyed metal fuel containing uranium and plutonium normally has an even lower melting temperature. For example, an 88 wt.% U—12 wt.% Pu alloy has a melting temperature of about 1130° F. (610° C.).

On the other hand, fissionable fuels in metallic form provide excellent thermal conductivity for highly efficient heat transfer, and maximum concentration of fissionable atoms per unit volume. Thus, more power can be produced per unit volume with metallic fuel and heat can be transferred more efficiently to the liquid coolant.

Alloys of uranium metal and/or plutonium metal have been proposed and used to enhance metal fuels and overcome the shortcomings of metallic fuel. For example, small amounts of alloying metals such as molybdenum, niobium, titanium, zirconium, vanadium or chromium have been used to stabilize phase structures and, in turn, the properties attributable thereto in metallic fuels. For instance, the article "Properties of Uranium-Plutonium-Base Metallic Alloys" by R. J. Dunworth et al., Argonne National Laboratory, Annual Progress Report for 1965, ANL-7155 (1965), pp. 14–25, discloses the alloying of metal fuel with zirconium or titanium to increase the melting temperature of uranium-plutonium fuel.

Zirconium is also included as an alloying component in such metallic fuels to provide an elevated solidus temperature for the fuel and to enhance its chemical compatibility with stainless steel, which is commonly employed in fuel containers for service in liquid metal-cooled nuclear reactors. A preferred metal fuel alloy which has been considered for commercial service comprised an alloyed composition of 64 wt.% U—26 wt.% Pu—10 wt.% Zr. Such an alloy has a melting point of about 1868° F. (1020° C.).

However, additional problems attend the technique of alloying conventional fissionable metal fuels with non-fuel elements such as zirconium metal. It has been found that evidently due to inherent reactor conditions of intense radiation and high temperatures, metal alloy fuels which initially comprise a substantially uniform mixture of alloyed ingredients become chemically redistributed into nonuniform mixtures. This restructuring of the metal alloyed fuel has a pronounced effect upon its properties and their uniformity throughout the mass of the fuel body.

One significant aspect of this redistribution of the alloyed ingredients, such as zirconium, is the inward migration of the zirconium metal to the inner or central area of the fuel body. This is accompanied by an increase in the solidus temperature of the inner or central area and correspondingly a reduced solidus temperature in the outer or peripheral area of the unit. Thus, the melting temperature of the remaining alloy in the peripheral area of the fuel body is lowered, and the intended effect of the added zirconium to avoid low-melting phase formation is reduced or negated. A lower melting temperature of the surface portion of a fuel body increases the potential for chemical interaction with adjoining materials.

When the zirconium migrates, the remaining alloy ingredients form lower-melting-point alloys or eutectic compositions. Moreover, in the absence of zirconium, components remaining in the peripheral area of the fuel, such as plutonium and fission-produced cerium, form low-melting-point phases which can attack or react with the stainless steel of the fuel container (hereinafter "cladding"), thereby degrading the integrity of the cladding. An interaction between fuel components and the stainless steel cladding will degrade the structural strength of the relatively thin wall of the cladding due to reduced thickness, altered composition or resulting permeability.

A paper entitled "Chemical Interaction of Metallic Fuel with Austenitic and Ferritic Stainless Cladding", by G. L. Hofman et al., Argonne National Laboratory, Tucson Conference, September (1986), discussed interdiffusion phenomena between metallic fuel comprising U—Pu—Zr and components of ferritic stainless steel fuel cladding which could degrade the performance of the fuel composition. These phenomena include formation of strength-reducing diffusion zones within stainless steel, intergranular penetration of fuel ingredients into stainless steel, and formation of eutectic areas having a melting temperature below the operating temperature.

Typical liquid metal-cooled nuclear reactors conventionally use stainless steel cladding, preferably those stainless steel alloys marketed under the commercial designations HT9 or D9. Typical compositions for these stainless steel alloys are given in Table 1.

TABLE 1

| Ingredient (wt. %) | HT9 | D9 |
|---|---|---|
| Fe | 84.8 | 65.7 |
| Cr | 12.0 | 14.5 |
| Ni | 0.6 | 14.5 |
| Mo | 1.0 | 2.0 |
| Mn | 0.5 | 2.0 |
| W | 0.4 | — |
| V | 0.3 | — |
| Si | 0.2 | 1.0 |

TABLE 1-continued

| Ingredient (wt. %) | HT9 | D9 |
|---|---|---|
| Ti | — | 0.3 |
| C | 0.2 | 0.03 |
| N | 0.004 | 0.005 |
| O | | 0.006 | 0.006 |

Low-melting-point metal alloys form at the interface between U—Zr or U—Pu—Zr metal alloy fuels and stainless steel cladding such as HT9 and D9 alloys. These low-melting-point alloys can seriously degrade cladding performance during high-temperature reactor transient events.

Cladding materials are selected for their resistance to interaction with U—Zr or U—Pu—Zr metal alloy fuels. Nevertheless, diffusion couple studies and irradiation evaluations have demonstrated that diffusion of plutonium, uranium and fission products to the cladding material occurs without a corresponding diffusion of enough zirconium to maintain the desired high-melting-point alloy composition at the interface of the fuel and the cladding.

Irradiation studies demonstrated that contact between HT9 cladding and 71 wt.% U—19 wt.% Pu—10 wt.% Zr metal alloy fuel resulted in a 7 to 10—μm-deep reaction zone in the steel alloy at 2.9 a/o burnup, which zone was enriched in plutonium and the radiation product cesium. Both plutonium and cesium form low-melting-point alloys with stainless steel alloy constituents as illustrated in Table 2.

TABLE 2

| Alloy | Melting Point (°C.) | Composition (Wt. %) |
|---|---|---|
| Pu-Fe | 410 | 2.5 Fe |
| Pu-Ni | 475 | 4 Ni |
| Ce-Ni | 477 | 8 Ni |
| Ce-Fe | 592 | 4 Fe |
| Pu-U | 610 | 12 U |
| Pu-Mo | 613 | 0.5 Mo |
| Pu-Cr | 615 | 0.5 Cr |
| Pu-Ce | 625 | 12 Ce |
| Pu | 640 | — |
| Pu-Zr | >640 | * |
| U-Fe | 725 | 11 Fe |
| U-Ni | 740 | 11 Ni |
| Zr-Ce | 750 | 3 Zr |
| U-Cr | 860 | 5 Cr |
| U-26Pu-2Zr | 913 | — |
| Zr-Fe | 934 | 16 Fe |
| Zr-Fe | 961 | 17 Ni |
| U | 1134 | — |
| U-Zr | >1134 | * |
| Zr-Cr | 1300 | 18 Cr |

*Form solid solutions, Pu and U have lowest melting points in the system.

The nonuniform melting conditions of metal alloy fuels in reactor service and the potential effect is discussed in an article entitled "Post-Irradiation Examination of U—Pu—Zr Fuel Elements Irradiated in EBR-11 to 4.5 Atomic Percent Burnup" by W. F. Murphy et al., Argonne National Laboratory, ANL-7602, November (1969). This article additionally discusses the extensive physical changes which occur in metal alloy fuel during fission, such as extensive deformation. Such deformation includes expansion or swelling of up to about 30% by volume due to thermal effects and internal generation of fission-produced gases.

The potential for cladding failure is discussed in an article entitled "Metallic Fuel Cladding Eutectic Formation During Post-Irradiation Heating" by B. R. Seidel, Argonne National Laboratory, Trans. Ans. 34, June (1980), pp. 210 and 211.

A method of inhibiting an interaction between a metal alloy fissionable fuel for a nuclear reactor and a stainless steel cladding for the fuel was disclosed in U.S. Pat. No. 4,971,753, which patent is assigned to the assignee of the present application. In accordance with that teaching, a fuel element having a body of alloyed uranium metal fuel housed within stainless steel cladding is provided with an expendable source of alloying metal which raises the melting temperature of the metallic fuel. In particular, a zirconium barrier is placed between the alloyed uranium metal fuel body and the stainless steel cladding. This barrier protects the stainless steel cladding from the deleterious effects of low-melting-point alloys resulting from irradiation by increasing the availability of zirconium to raise the melting point of alloys formed at the fuel/cladding interface.

U.S. Pat. No. 4,971,753 states that the zirconium barrier can be installed in the fuel element in the form of a layer of zirconium formed on the outer peripheral surface of the fuel body or on the inner peripheral surface of the cladding; or in the form of a hollow circular cylinder, e.g., rolled zirconium metal foil or a rigid tubular section, of zirconium inserted in the space intermediate the fuel body and cladding.

The use of barrier material of circular cross section between the metal fuel slugs and the stainless steel cladding of the fuel pin divides the gap between the fuel and the cladding into two smaller gaps: one between barrier and fuel and the other between barrier and cladding. Thus, one result of barrier insertion is that a second gap is created between the fuel inside the cladding and reactor coolant outside the cladding. Another result is that the diametrical gaps between the various pin components are reduced. These gaps must be filled with liquid sodium (or other suitable liquid metal), that is, the components must be sodium thermal bonded, to provide an acceptable heat transfer path between the fuel and reactor coolant and thereby prevent unacceptable temperatures during operation.

The top of the space between the fuel and cladding is typically occupied by helium gas. If the respective opposing surfaces of pin components form a gap so small that those surfaces are not wetted by the liquid sodium and the gap is filled with gas bubbles, then the sodium thermal bond will have a void. Excessive voiding in the sodium thermal bond could produce a temperature differential between the fuel and cladding of 500°–600° C., causing localized fuel melting during radiation. Thus, it is critical that the quality of the sodium thermal bond be verified during fabrication of the fuel pins.

In an article by A. L. Pitner and J. O. Dittmer entitled "FFTF Metal Fuel Pin Sodium Bond Quality", Trans. Am. Nucl. Soc., Vol. 59, pp. 144–145 (1989), the results of sodium bond quality tests for metal fuel pins without barriers were reported. The contents of this article are incorporated by reference herein.

In this article, the authors concluded that small voids in the sodium bond encountered in the lower regions of the fuel pin were invariably situated on the side where an off-center fuel slug contacted the cladding. The high surface tension of the liquid sodium prevented wetting of the small gap areas. Thermal analysis of this metal fuel pin design revealed that a significant fuel temperature increase was not observed until the unbonded area, i.e., the so-called "degree of circumferential unbonding", approached an angle of 90 degrees around the cladding circumference.

This teaching has applicability to fuel pins with barriers. The of-center location of the fuel slug results from a combination of gravity and divergence from slug linearity. The use of a circular, thin-walled barrier tube between the metal fuel and cladding will result in a fuel pin cross section in which the off-center fuel slug and barrier are located on one side of the pin, with the barrier sandwiched between the fuel slug and cladding. The addition of the barrier tube results in smaller gaps between the fuel pin components which provide less diametrical area for sodium bonding. As a result, the potential for unbonded areas in the barrier fuel pin is increased.

SUMMARY OF THE INVENTION

The present invention improves upon the teachings of U.S. Pat. No. 4,971,753 by providing a barrier of non-circular cross section between the stainless steel cladding and metal fuel slugs. In accordance with a preferred embodiment of the invention, the barrier is formed as a tube of elliptical cross section. In contrast, the fuel slug and cladding are both circular in cross section. The elliptical feature of this barrier design promotes improved liquid metal thermal bonding in both the cladding/barrier and barrier/fuel interface regions.

The replacement of a circular barrier with an elliptical barrier results in three areas with thermal bond gaps having an angle which approaches that for a metal fuel pin without a barrier. Thus, the degree of circumferential unbonding will be less than that which results in localized fuel melting during radiation. Also, because the amount of liquid metal bonding material in contact with the surface of the fuel is greater for an elliptical barrier than for a circular barrier, heat generated by the fuel is transported to the coolant more efficiently.

The elliptical barrier is preferred because it is the easiest and least expensive to fabricate. However, other non-circular shapes could be used, for example, a rectangle with rounded vertices or any regular polygon with rounded vertices. The invention is not limited in scope to the elliptical barrier.

The invention further encompasses a method for improving heat transfer in a fuel element having an elongated body of a metal alloy fissionable fuel and having an elongated cladding in which the fuel body is housed. The body of fuel has a smaller cross-sectional area than the cross-sectional area of the internal space of the cladding, thereby providing an intermediate space between the body of fuel and the cladding. The method comprises the steps of: forming a cylindrical barrier having a non-circular cross section; installing the non-circular barrier in the intermediate space to circumferentially surround the body of fuel; inserting metal bonding material in solid form inside the cladding; closing the fuel element to seal the intermediate space; and melting the metal bonding material to fill at least a portion of the intermediate space, thereby improving the thermal conductivity between the fuel and reactor coolant.

BRIEF DESCRIPTION OF THE DRAWING

The preferred embodiments of the invention will be described in detail with reference to the drawing, which is a cross-sectional view (not to scale) of a nuclear fuel element having a fuel/cladding barrier of elliptical cross section.

DETAILED DESCRIPTION OF THE PREFERRED EMBODIMENTS

Referring to the drawing, the fuel element or pin 10 comprises an elongated body of fuel 12, such as a rod sometimes referred to as a slug, containing a fissionable material in the form of metal or metal alloy. The fuel body 12 (or several aligned fuel bodies) is housed within a sealed, tube-like metal container 14, sometimes referred to as "fuel cladding". Cladding 14 isolates the fuel body 12 from the coolant which flows over the exterior surface of the fuel element 10 to transfer heat away therefrom, thereby protecting the fuel from reaction with or contamination from the coolant. The cladding also seals in fission products and precludes their escape into the coolant.

The fuel body 12 is designed in configurational dimensions for radial expansion of about 25 to 30 vol.% due primarily to internally generated, fission-produced gases. Thus, the initially produced metal fuel units are of substantially smaller cross-sectional area than the internal cross-sectional area within the fuel cladding 14. As a result, an intermediate space 16 is formed between the exterior surface of the fuel body 12 and the interior surface of the fuel cladding 14. This initial intermediate space 16 is designed to accommodate the expansion of the fuel body 12 attributable to the gases produced during service and to protect the fuel cladding 14 from physical stress and possible rupture which would otherwise arise due to internal pressure of a confined body of expanding fuel.

The intermediate space 16 of the fuel element 10 is initially filled during the fuel fabrication process with a liquid metal bonding material such as sodium (preferred), potassium, lithium or their alloys in solid form, which becomes molten at normal reactor operating temperatures and is displaced by the fuel as it expands. The bonding material enhances heat transfer from the fuel outward to the cladding while the fuel is expanding to fill the intermediate space.

The fuel units of a typical fuel element for service in a liquid metal-cooled nuclear reactor are cylindrical bodies having a diameter of approximately 0.19 inch. The stainless steel cladding which surrounds such fuel units has a wall thickness of about 20 mils and an outside diameter of about 0.26 inch.

The barrier in accordance with a preferred embodiment of the invention is a rigid elliptical tubular body 18 of expendable alloying metal which is positioned between the fuel unit and fuel cladding. As a result, the metal alloy fuel interacts with the barrier material, not the stainless steel of the cladding. The barrier may be composed of any alloying metal having the property of increasing the melting temperature of metallic fuels, such as zirconium, titanium, niobium, molybdenum, vanadium, chromium and the like. Zirconium is a preferred alloying metal for the practice of the invention.

The thickness of the elliptical barrier is preferably uniform. The amount of barrier material between the metal fuel and the stainless steel cladding necessary to raise the interface alloy temperature to an acceptable level is in the range of 0002 to 0.004 inch.

The insertion of elliptical barrier 18 results in three areas with thermal bond gaps which approach the size of those for a metal fuel pin without a barrier. In particular, the barrier is not sandwiched between the fuel slug and cladding when the fuel slug and barrier are situated off-center, as is the case for the circular barrier. Instead the elliptical barrier contacts the cladding at two separate areas and contacts the fuel slug at an area located intermediate the two areas of barrier/cladding contact. At each area of contact, narrowing of the gap between components occurs on only one side of the barrier, not both sides simultaneously. In particular, there is a gap between the elliptical barrier and circular cladding at the area of contact between the barrier and fuel slug. Thus, the degree of circumferential unbonding will be less than that which results in localized fuel melting during radiation.

Also, because the radius of curvature of the elliptical barrier is greater than that of a circular barrier at the area of contact with the fuel slug, more liquid metal bonding material enters the gaps on either side of the fuel/barrier area of contact. Therefore, the amount of bonding material in contact with the surface of the fuel is greater with an elliptical barrier. The increased interface of bonding material with the fuel enables heat generated by the fuel to be transported to the coolant more efficiently.

The preferred embodiment has been described in detail hereinabove for the purpose of illustration only. It will be apparent to a skilled nuclear reactor engineer that barriers having various other non-circular shapes could be used without departing from the spirit and scope of the invention as defined in the claims set forth hereinafter. For example, the barrier of the invention could be fabricated as a tube having a rectangular cross section with rounded vertices or a cross section in the shape of a regular polygon (e.g., equilateral triangle, square, etc.) with rounded vertices. However, recognizing that a circle can be characterized as a regular polygon having an infinite number of sides, the number of sides of the regular polygon within the scope of the invention must be less the number of sides which would cause the polygonal shape to produce the same degree of circumferential unbonding as that produced by a circular barrier.

In short, any non-circular barrier could be used in accordance with the invention provided that when inserted between an off-center circular fuel slug and a circular cladding, the barrier geometry is such that the area of contact between the fuel and the barrier and the area of contact between the barrier and the cladding will not be situated at the same point along the periphery of the barrier, as is possible when a circular barrier is used.

We claim:

1. In a fuel element for a nuclear reactor comprising an elongated body of a metal alloy fissionable fuel of circular cross section housed within a sealed elongated cladding having an internal space of circular cross section, said body of fuel having a smaller cross-sectional area than the cross-sectional area of said internal space of said cladding, thereby providing an intermediate space between said body of fuel and said cladding, and a barrier of material arranged in said intermediate space to circumferentially surround said body of fuel, the improvement wherein said barrier is a rigid cylindrical tube having a non-circular cross section.

2. The fuel element as defined in claim 1, wherein said non-circular cross section is substantially elliptical.

3. The fuel element as defined in claim 1, wherein said non-circular cross section is substantially rectangular with rounded vertices.

4. The fuel element as defined in claim 1, wherein said non-circular cross section is substantially a regular polygon with rounded vertices.

5. The fuel element as defined in claim 1, wherein said tube comprises metal.

6. The fuel element as defined in claim 5, wherein said metal is selected from the group consisting of zirconium, titanium, niobium, vanadium, chromium and molybdenum.

7. The fuel element as defined in claim 5, wherein said fuel comprises metallic uranium and plutonium and their alloys with elements taken from the group consisting of zirconium, titanium, niobium, vanadium, chromium and molybdenum, said cladding comprises stainless steel, and said metal is selected from the group consisting of zirconium, titanium, niobium, vanadium, chromium and molybdenum.

8. A fuel element for a nuclear reactor comprising an elongated body of a metal alloy fissionable fuel of circular cross section housed within a sealed elongated cladding having an internal space of circular cross section, said body of fuel having a smaller cross-sectional area than the cross-sectional area of said internal space of said cladding, thereby providing an intermediate space between said body of fuel and said cladding in which said fuel body can occupy a plurality of off-center positions, and a barrier of material arranged in said intermediate space to circumferentially surround said body of fuel, said barrier being a rigid cylindrical tube having a cross section such that when said fuel body occupies any one of said off-center positions, first and second areas on an outer peripheral surface of said barrier contact said cladding and a third area on an inner peripheral surface of said barrier contacts said fuel body, said first, second and third contact areas being located such that said first and second contact areas do no overlap said third contact area at any point along the periphery of said barrier.

9. The fuel element as defined in claim 8, wherein said barrier cross section is substantially elliptical.

10. The fuel element as defined in claim 8, wherein said barrier cross section is substantially rectangular with rounded vertices.

11. The fuel element as defined in claim 8, wherein said barrier cross section is substantially a regular polygon with rounded vertices.

12. The fuel element as defined in claim 8, wherein said tube comprises metal.

13. The fuel element as defined in claim 12, wherein said metal is selected from the group consisting of zirconium, titanium, niobium, vanadium, chromium and molybdenum.

14. The fuel element as defined in claim 12, wherein said fuel comprises metallic uranium and plutonium and their alloys with elements taken from the group consisting of zirconium, titanium, niobium, vanadium, chromium and molybdenum, said cladding comprises stainless steel, and said metal is selected from the group consisting of zirconium, titanium, niobium, vanadium, chromium and molybdenum.

15. A method for improving heat transfer in a fuel element having an elongated body of a metal alloy fissionable fuel of circular cross section and having an elongated cladding in which said fuel body is housed, said cladding having an internal space of circular cross section, said body of fuel having a smaller cross-sectional area than the cross-sectional area of said internal space of said cladding, thereby providing an intermediate space between said body of fuel and said cladding, comprising the steps of:

forming a rigid cylindrical tube having a non-circular cross section;

installing said rigid cylindrical tube in said intermediate space to circumferentially surround said body of fuel;

inserting metal thermal bonding material in solid form inside said cladding;

closing said fuel element to seal said intermediate space; and melting said metal thermal bonding material and thereby filling at least a portion of said intermediate space with said liquid metal thermal bonding material.

16. The method as defined in claim 15, wherein said metal thermal bonding material is selected from the group consisting of sodium, potassium, lithium and their alloys.

17. The method as defined in claim 15, wherein said non-circular cross section is substantially elliptical.

18. The method as defined in claim 15, wherein said non-circular cross section is substantially rectangular with rounded vertices.

19. The method as defined in claim 15, wherein said non-circular cross section is substantially a regular polygon with rounded vertices.

20. The method as defined in claim 15, wherein said barrier comprises a metal selected from the group consisting of zirconium, titanium, niobium, vanadium, chromium and molybdenum.

* * * * *